US009253099B2

(12) United States Patent
Szabó et al.

(10) Patent No.: US 9,253,099 B2
(45) Date of Patent: Feb. 2, 2016

(54) SYSTEM AND METHOD FOR OVERLOAD CONTROL IN A NEXT GENERATION NETWORK

(71) Applicant: TELEFONAKTIEBOLAGET L M ERICSSON (PUBL), Stockholm (SE)

(72) Inventors: István Szabó, Budapest (HU); Daniel Krupp, Budapest (HU); Áron Szentesi, Budapest (HU); Ian Broadhurst, Rugby (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 183 days.

(21) Appl. No.: 13/873,520

(22) Filed: Apr. 30, 2013

(65) Prior Publication Data

US 2013/0294248 A1 Nov. 7, 2013

Related U.S. Application Data

(63) Continuation of application No. 12/440,881, filed as application No. PCT/IB2007/002602 on Sep. 10, 2007, now Pat. No. 8,446,829.

(60) Provisional application No. 60/825,170, filed on Sep. 11, 2006.

(51) Int. Cl.
*H04L 1/00* (2006.01)
*H04L 12/819* (2013.01)
*H04L 12/801* (2013.01)
*H04L 29/08* (2006.01)
*H04L 29/06* (2006.01)

(52) U.S. Cl.
CPC ............... *H04L 47/21* (2013.01); *H04L 47/12* (2013.01); *H04L 65/1046* (2013.01); *H04L 67/141* (2013.01)

(58) Field of Classification Search
None
See application file for complete search history.

(56) References Cited

U.S. PATENT DOCUMENTS 6,363,052 B1 * 3/2002 Hosein .......................... 370/230
6,785,546 B1 * 8/2004 Djuric ........................... 455/445

(Continued)

FOREIGN PATENT DOCUMENTS

EP     1 478 157 A1     11/2004
JP     H03-096050 A     4/1991

(Continued)

OTHER PUBLICATIONS

Access Gateway—Media Gateway Controller Rate Based Overload Control. Draft ETSI ES 2XX XXX v0.5.0 (Jun. 2006).

*Primary Examiner* — Kibrom T Hailu

(57) ABSTRACT

A Call Server in a network is able to monitor an offered rate of incoming calls per Access Gateway (AGW). A calculated GlobalLeakRate can be distributed between the AGWs in proportion to the traffic rate they offer. A leak rate calculation method is used to calculate the GlobalLeakRate control parameter of the ETSI NR restrictor at an overloaded Control Server The leak rate calculation is based on the POTS call rejection rate. In one particular embodiment of the present invention, the calculation is based on bringing the call reject rate close to a configurable low target reject level. An MGC is able to identify the end of an overload event with a greater degree of confidence and an AGW is able respond appropriately if the AGW is prematurely instructed to stop the control.

24 Claims, 8 Drawing Sheets

(56) References Cited

U.S. PATENT DOCUMENTS 6,826,268 B2* 11/2004 Adams .................. 379/112.04
2007/0171823 A1* 7/2007 Hunt et al. ................ 370/232
2010/0241711 A1* 9/2010 Ansari et al. .............. 709/205

FOREIGN PATENT DOCUMENTS

| WO | WO 98/57504 A1 | 12/1998 |
| WO | WO 2005/120087 A1 | 12/2005 |

* cited by examiner

SYSTEM AND METHOD FOR OVERLOAD CONTROL IN A NEXT GENERATION NETWORK

CROSS-REFERENCE TO RELATED APPLICATIONS

This application is a continuation of co-pending U.S. patent application Ser. No. 12/440,881 filed Sep. 29, 2009, which is a 371 of International Application No, PCT/IB2007/002602, filed Sep. 10, 2007, and which claims the benefit of U.S. Provisional Application No. 60/825,170. The disclosures of each of the foregoing priority applications are fully incorporated herein by reference.

BACKGROUND OF THE INVENTION

The present invention relates to Access Media Gateways (AGWs). More particularly, and not by way of limitation, the present invention is directed to a system and method for overload control between AGWs and the associated Media Gateway Controllers (MGC) in Next Generation Networks (NGNs).

Abbreviations and Definitions
a. AACC Adaptive Automatic Congestion Control
b. AGW Access Media Gateway
c. CS Call Server
d. GOS Grade of Service
e. ISUP ISDN User Part
f. MSAN Mufti Service Access Node (equivalent to and interchangeable with AGW)
g. MGC Media Gateway Controller (equivalent to and interchangeable with CS)
h. NGN Next Generation Network
i. POTS Plain Old Telephone Service FIG. 1a is a high-level block diagram of a Next Generation Network (NGN). The NGN typically contains multiple domains which are controlled by a single Call Server (CS) (also known as a Media Gateway Controller (MGC)). Call Servers are connected to each other and to call control nodes in peer networks. Call related signaling messages are exchanged and the Call Servers control gateway nodes. The gateway nodes served by these Call Servers provide bearer (transport) functionality for media streams corresponding to calls going on between subscribers.

For the successful establishment of an end to end call, several nodes in the access and the core network have to have enough spare processing resources to serve the call attempt. Numerous scenarios could be envisaged, such as televoting or disaster events, where certain nodes become the bottleneck in the network and therefore need to reject call requests in order to preserve their integrity and stable state. By increasing the load on a target node above its engineered capacity its throughput degrades significantly, moreover an extremely high offered load may cause the target node to restart. Hence signaling protocols have to be armed with load control functions, which ensure that the source node decreases its admission rate by rejecting calls in order to relieve the heavy load on the congested target node.

Each Access Media Gateway (AGW) provides connection to the network for thousands of subscribers. Currently, simulations of a proposed European Telecommunications Standards institute Notification Rate (ETSI_NR) control have shown that control in the NGN can be dependent on a choice of algorithm used by a control adaptor and setting of control parameters. It has been shown that Inappropriate choices can lead to premature termination of control during times of overload. Overloads can be caused by a moderate increase across all the associated AGWs at the same time or by an increase on a smaller subset of the AGWs. Normally, an AGW initiates new calls by sending off-hook notification events to a Call Server (equivalent to a Media Gateway Controller and will be interchangeable with MGC hereinafter.

FIG. 1b illustrates a high level block diagram of an overload control mechanism between an MGC and AGW. The ETSI draft mentioned above (ETSi_NR) describes an overload control mechanism between the MGCs and the AGWs to protect the MGCs from becoming overloaded during the previously described mass call events. FIG. 1b illustrates a high-level functional block diagram according to ETSi_NR. ETSi_NR proposes that leaky bucket restrictors be applied at the AGWs to throttle originating POTS call attempts towards the MGCs, A so-called LoadLevel supervision function is implemented in the MGC which periodically measures its load state. If the LoadLevel reaches a critical value, the MGC Initiates the originating call restriction mechanism at the AGWs. During periods of overload, the MGC periodically calculates a GlobalLeakRate based on the current LoadLevel. This GlobalLeakRate is then distributed among the AGWs based on their associated $W_j$ weights. The weight set is fixed and preconfigured in the MGC. This new teak rate value (notrat), calculated for each AGW using its preconfigured $W_j$ weight, is sent to the gateway in a subsequent H.248 MODIFY command from that MGC. Notrat (Notification Rate) provides the rate of off-hook notifications from terminations in the NULL context that can be sent to the MGC by a given AGW. The AGW then sets the leak rate of its leaky bucket to the notrat rate received from the MGC end will use this leak rate to regulate the off-hook notifications. The initial value of the GlobalLeakRate, which is used when the overload is detected at the MGC, is a configuration parameter in the MGC called InitGlobalLeakRate. The value is set to a sufficiently low value to immediately relieve congestion at the MGC, and the calculated GlobalLeakRate is expected to adapt upwards gradually to ensure high utilization of the Media Gateway Controller.

The mechanism described in the current ETSI draft may not provide appropriate protection of the Media Gateway Controllers in all cases. It is foreseen that—if the draft is implemented as currently specified—certain distributions of originating call attempts among the Access Media Gateways can fool the adaptation algorithm and temporarily render the overload control ineffective.

Four main areas can be identified where the currently proposed control scheme has shortcomings:
  Failure to tackle focused overload from a group of nodes;
  Slow convergence of the control mechanism;
  No interoperability with overload control solutions protecting the Media Gateway Controller from other interfaces; and
  Termination of control.

If a small group of AGWs (m) are responsible for an overload, then the m group of AGWs offer calls to the associated MGC at a rate determined by restrictors which are styled as "leaky bucket" restrictors (the teak rate of the restrictors are a weighted portion of the MGCs GlobalLeakRate). If the small group of AGWs are the only AGWs offering calls to the MGC while the remaining AGWs (n) offer no calls to the MGC and assuming that all AGWs are equally weighted (i.e., AGW weight, $W_j=1/(m+nJ|$ then if the situation persists Song enough the MGC GlobalLeakRate (G), may settle to $G=(C/m)*(m+n)$, where C is the capacity of the MGC. Depending on the ratio of m and n, this can be many times more than the actual capacity of the MGC. Also each AGW regardless if it is offering calls to the MGC receives a leak rate of $G*W_j=C/m$.

If traffic demand subsequently increases on the non-loaded group of AGWs (n), then the rate of calls offered to the MGC by this group of AGWs will be limited to the rate determined by their leaky buckets and the MGC will become overloaded since the earlier active group m, together with the newly activated group n of the AGWs offer more traffic $((C/m)*(m+n))$ than its engineered capacity of C. This state potentially renders the control ineffective for a period of time until a Control Adaptor adjusts the GlobalLeakRate appropriately.

FIG. 2 is a high-level block diagram Illustrating overloads of an MGC causing ineffective control at an MGC. If the load offered to an MGC is not distributed evenly, but e.g., group 208 of AGW1 and AGW2 are responsible for an overload, the GlobalLeakRate value will be increased by the Control Adaptor (see FIG. 2) far above the real call processing capacity of the MGC. In this scenario this pair of AGWs, group 206, causing the overload will admit calls at a rate determined by their leaky bucket, while other AGWs belonging to group 208 offer calls far below the leak rate they have received from the MGC. (Their leaky buckets do not restrict). If the traffic demand suddenly increases in the area served by group 208 of AGWs, then the nodes in group 208 start to offer calls at the rate determined by their leaky buckets and the MGC will get into overload causing the control to be ineffective for a considerable amount of time. For instance, the Media Gateway Controller can have four MSANs (AGWs) connected to it. Each MSAN has an equal weighting as each of them terminates the same number of subscriber lines. When group 206 of nodes want to offer higher calling rates than the capacity of the MGC, the MGC will detect overload, set the GlobalLeakRate to the InitGlobalLeakRate, and send ¼ of this GlobalLeakRate value to each of the four MSANs.

The MGC starts to gradually increase the GlobalLeakRate value in order to increase the MGC utilization, and continues this process of increasing the GlobalLeakRate until the total incoming rate from the MSANs reaches C, the processing capacity of the Media Gateway Controller. Since it is assumed that only 2 of the four MSANs are responsible for the overload, the increase of the GlobalLeakRate continues until it reaches 2C. At this point, the MGC sends LeakRate2*C/4=C/2 leak rate values to the MSANs, so the 2 MSANs (AGWs) in group 206 offer enough calls to saturate the Media Gateway Controller. If group 208 of nodes starts to offer traffic then they are also allowed to send C/2 each, therefore the total incoming rate will be 2 times C resulting in two times overload. This case is clearly different than when the overload initially occurs at the initiation of control, because initially the GlobalLeakRate value is initialized to a suitably low value, while in this case the overload will persist for a considerable amount of time until a downward adaptation of the GlobalLeakRate occurs.

Another concern is whether the control can adapt fast enough to be able to follow the changes in the offered rate with reasonable speed. In case of a serious focused overload the global leak rate has to be increased to an extremely high level, e.g. if 10% of the AGWs generate the overload and the CS capacity is 1000 cail/s then the global leak rate shall rise to 10000, and even with a quite large adaptation step (e.g. 10 call/s^2) it can take 1000 seconds to adapt to full utilisation of the MGC, which is about 16 minutes!

The above illustration might be an extreme example but minutes long adaptation times are still not impossible. This questions the adaptation ability of the whole ETSI-NR algorithm—in fact, what happens here is that the constant provisioned weighting system has a multiplicative effect that can slow down the adaptation in case of a focused overload. The Call Server will unnecessarily reject many calls for a long time period in case of a step overload which means a huge loss of revenue, especially in scenarios when the step overload is caused by e.g. tele-voting, typically with a premium call rate. On the other band, if we increase the adaptation step then the control will oscillate.

It is assumed that when the Call Server fails to allocate capacity for an originating call request it rejects the attempted request. The main purpose of overload control is to minimize the number of such rejects allowing the CS to maximize its throughput. In NGNs the Call Servers have to serve network initiated and access initiated call requests. Therefore if the CS becomes overloaded its own infernal overload protection mechanism will reject both originating and incoming calls, incoming call requests are initiated using the ISUP protocol from legacy POTS exchanges or enveloped in the SIP-I protocol from Call Servers, but other industry standard call control protocols like SIP or H.323 can also be used. As an example, the ISUP protocol utilizes its own overload control mechanism called Adaptive Automation Congestion Control (AACC). It is desirable to guarantee that in periods of overload, incoming and originating calls to get a configurable ratio of share in the admitted stream, therefore interoperability of overload control solutions (e.g. ETSI_NR and AACC) protecting the same node is crucial. The current ETSI_NR draft provides no solution to solve this interoperability problem. A GlobalLeakRate calculation algorithm is needed, which ensures that the GlobalLeakRate is updated in such a way that the incoming calls from POTS exchanges and other Call Servers cannot squeeze out originating calls from the AGWs and vice versa when contending for the capacity of the CS.

Finally, the existing solution fails to tackle the problem of termination of the control properly. Since the call admission control is not performed on the Call Server (CS), it is not known when calculating the leak rate if the leaky buckets at the MSANs (AGWs) are still restricting traffic, or if the overload event has ceased. ETSI_NR suggests simply using a timer. A 'TerminationPendingTimer' is started when the measured LoadLevel of the Call Server falls below the GoalLoadLevel. If the measured LoadLevel does not go above the GoalLoadLevel during the lifetime of this timer, the control will be switched off upon timer expiry. But a LoadLevel below the GoafLoadLevel does not necessarily mean that overload has ceased, as it is possible that the mechanism is over-restricting, so that the sources do not offer enough calls to the CS for overload to occur. If the control switches off while the leak rate is still adapting upwards and the overload is present, the CS will soon be overloaded again, and the control will be switched back on with InitialGlobalLeakRate which then can easily result in on-off oscillation of the control, and under utilization of the CS. The required value of the GlobalLeakRate (G) will be dependent upon m and n making the G difficult to estimate, although typically it will need to be significantly larger than C. Under these circumstances, the convergence time of the control to the CS (MGCs) GoalLoadLevel maybe prolonged, consequently making setting the value of Termination Pending timer difficult. Inappropriate choices for these parameters can exacerbate this situation even more and potentially lead to premature termination of the control during the overload. For instance, if a TerminationPending timer is set too short and the overload control in the MGC terminates prematurely, the MGC will see a couple of undesired sudden high surge of load (solid curved line). Also, the admitted rate of calls will be lowered many times to the InitGlobalLeakRate and the control will switch on and off again and again. The graph in FIG. 8 illustrates this problem.

In an ideal case, at the start of an overload, the MGC enters the state 'Overloaded' and starts adapting the GlobalLeakRate so as to move closer to the MGCs GoalLoadLevel. If the point is reached whereby the MGCs' LoadLevel has fallen below the GoalLoadLevel (which is highly likely in the focused overload case as the InitGlobalLeakRate will likely result in the control over-restricting), the MGC changes state to TerminationPending', and the MGC invokes the following behavior:

a. if a TerminationPending timer (set when the MGC enters the Termination Pending state) expires, then state in the MGC Is changed to 'NotOverloaded'. Termination of throttling at an AGW is caused by the receipt of a negative Notification Rate (notrat) value; and b. if a new terminating or outgoing call attempt is received, then the MGC proceeds
with the call as normal. A Distribution Function in the MGC will calculate a current notrat value for that AGW (from the GlobalLeakRate) and send the current notrat value using an H.248 Modify command against the ROOT termination (unless the current notrat has already been sent to that $AGW_1$ in which case the current notrat is not sent). In order to minimize the number of H.248 transactions, the MGC may nest the Modify command within the same H.248 transaction as that used to progress the call. The Distribution Function notes the notrat value sent to that AGW.

c. the Control Adaptor continues to monitor the MGC Load Level, the Off Hook arrival rate and periodically updates the GlobalLeakRate, subject to the following two conditions:
1. the MGC is not exceeding the MaxGlobalLeakRate and
2, If the previous change to the GlobalLeakRate was an increase and the current Off Hook arrival rate is not greater than the previous Off Hook arrival rate, revert to the GlobalLeakRate in force before the previous change.

d. if the Control Adaptor detects that the LoadLevel exceeds the GoalLoadLevel, the MGC will move back to the 'Overloaded' state.

These two restrictions on the growth of the GlobalLeakRate are required in order to prevent the notrat values sent to the restrictors from rising to an extent that would be problematic in the event of a sudden increase in the off-hook rate. It would be advantageous to have a system and method for detecting the end of overload that overcomes the disadvantages of the prior art. The present invention provides such a system and method.

BRIEF SUMMARY OF THE INVENTION

The ETSI_NR drafted mechanism is extended with complementary solutions with which the mechanism will be able to successfully cope with some not yet bandied network events.

Certain traffic cases (focused overload from a group of access gateways) are identified which mislead the adaptation method of the current solution, rendering the control temporarily Ineffective, in the present invention, some autonomy is given to the Access Media Gateways to control their leak rates, to improve the overall network behavior considerably.

A Call Server is provided with the capability to monitor an offered rate of incoming calls (off-hook events) per AGW. Using this additional information the calculated GlobalLeakRate can be distributed between the AGWs in proportion to the traffic rate they generate instead of using a preconfigured weight set as in current methods. This new feature ensures that the currently available capacity of the Call Server, which is represented by the actual value of the GlobalLeakRate, is allocated to those AGWs which have traffic to offer. In this way it takes much less time for the MGC to adapt to a GlobalLeakRate value high enough to efficiently utilize the Call Server.

A leak rate calculation method is used to calculate the GlobalLeakRate control parameter of the ETSI_NR restrictor based on the originating POTS call rejection rate at an overloaded MGC (Call Server). The leak rate calculation is based on the same POTS call rejection rate, which is used by the leak rate calculation of the AACC mechanism, and to use the same rate adaptation mechanism. In one particular embodiment of the present invention, the calculation is based on bringing the call reject rate close to a configurable low target reject level. This way the originating POTS call restriction mechanism interoperates well together with the ISUP AACC mechanism.

A mechanism is disclosed with which an MGC is able to identify the end of the overload event with a greater degree of confidence and a mechanism is disclosed for use in an AGWs to ensure that the AGWs act properly if they are prematurely instructed to stop the control.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

In the following section, the invention will be described with reference to exemplary embodiments illustrated in the figures, in which.

DETAILED DESCRIPTION OF THE INVENTION

Figure 1A:
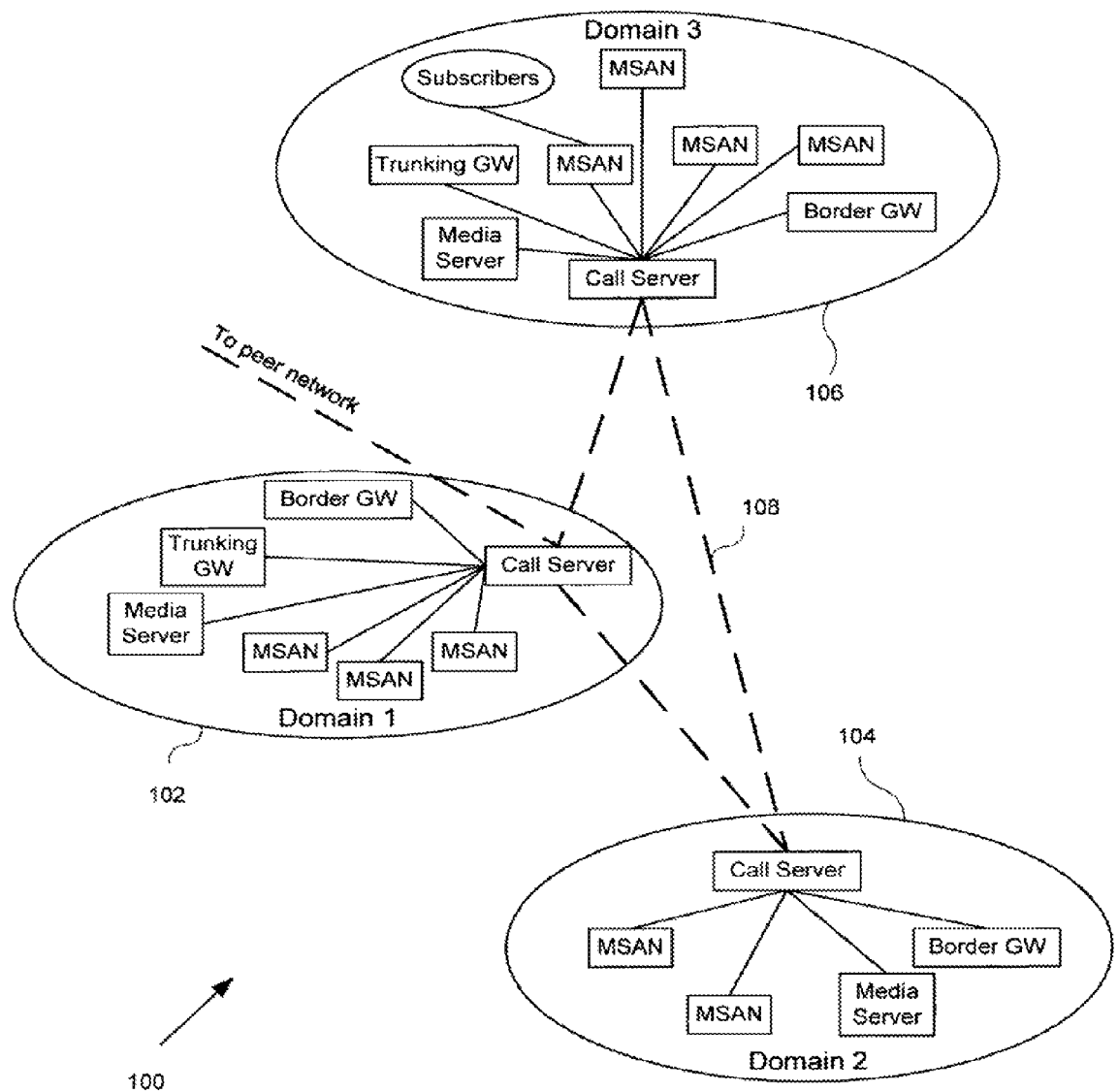
FIG. 1a depicts a high-level block diagram of a Next Generation Network.
Figure 1B:
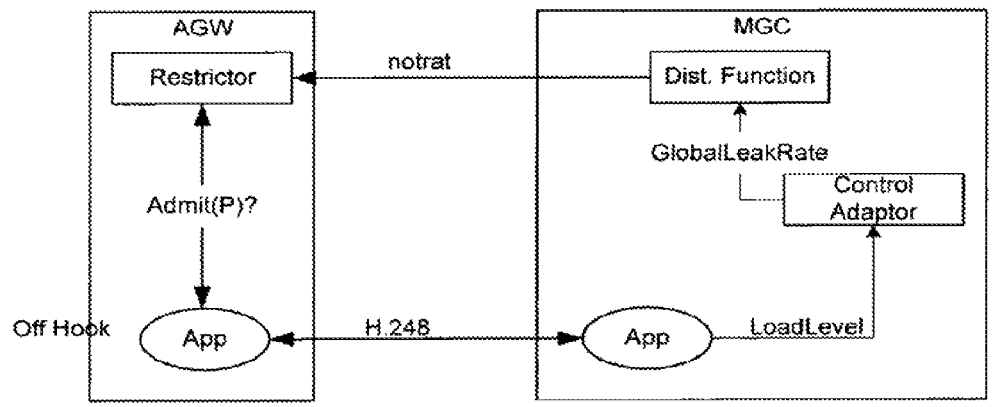
FIG. 1 b illustrates an overload control mechanism between an MGC and AGW.
Figure 2:
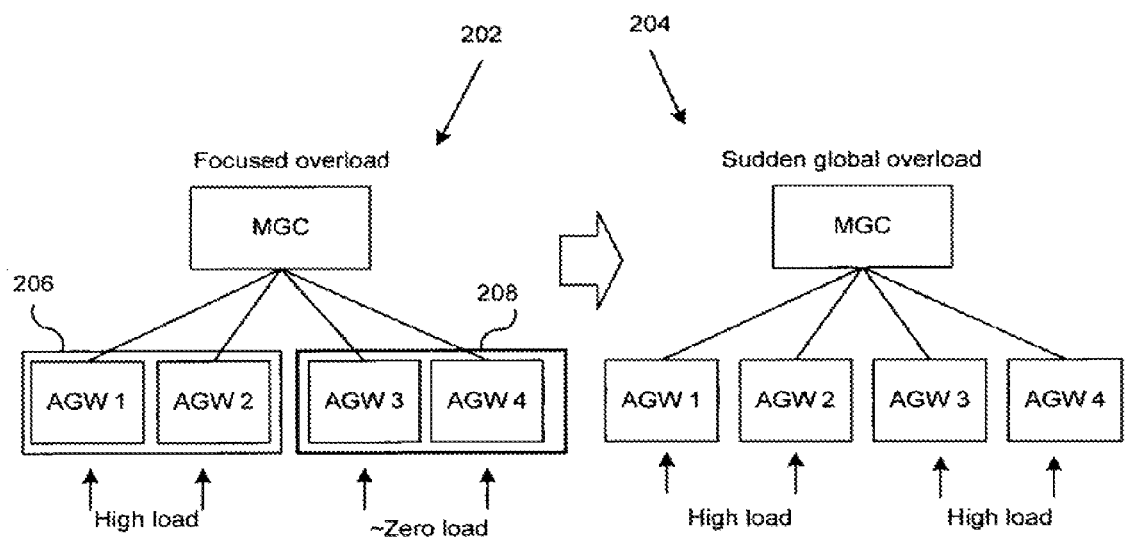
FIG. 2 is a high-level block diagram illustrating overloads of an MGC causing ineffective control.

FIGS. 3 through 7, discussed below, and the various embodiments used to describe the principles of the present invention in this patent document are by way of illustration only and should not be construed in any way to limit the scope of the invention.

A call server typically updates leak rate value at the AGWs by sending the leak rate value in the ETSI Notification Rate (ETSI-MR) package. "Package" defines additional properties, events, signals and statistics that may occur on H.248 Terminations. In the present invention, even though when first receiving it, AGWs immediately set their leak rate to the value included in the notrat property of the ETSI_NR package received from the call server, but later AGWs rather use the received notrat value as the maximum leak rate (L_max) to be reached if the bucket restricts traffic, and the AGWs continuously and autonomously adapt the rate of their leaky bucket restrictor taking also info account the rate of offered calls (off-hooks) from the connected subscribers.

The current leak rate of the bucket at the $i^{th}$ AGW is denoted by Lj. The $i^{th}$ AGW measures the incoming call attempt rate Ij periodically and compare it to the Li leak rate set for the leaky bucket restrictor. If (Ij>$L_1$ and I_i*(1+R) <=L_max, where 0<R<1 is a configurable parameter then the bucket restricts and the leak rate should be increased to Li' (1+R).

if Ij/(1+R)<Lj then the leaky bucket currently does not restrict at all and U should be decreased to L,=Ij*(1+R) in order to avoid the leak rate being stuck at a too high level, which would cause problems if the traffic distribution among the AGWs changes significantly. Each individual AGW uses the above detailed calculation method to update its leak rate value periodically, with TJKGSN periodicity.

Clearly, the AGW shall only increase the leak rate if the bucket rejects calls. In such a case the AGW will gradually increase Li until it reaches the teak rate limit L_max that the MGC (CS) sent for the very last time. With this scheme, increasing the leak rate unnecessarily can be avoided. So a global sudden step change in the offered rate will be seen at the MGC as a gradual increase, giving time for a Control Adaptor of the MGC to recalculate the appropriate level of restriction.

Automatically Obtaining a Weight Set Used for Distributing the Global LeakRate Among AGWs The value of the Lj leak rate is calculated by the MGC as I_i=Globall_eakRate*Wi Setting $W_1$ configuration variables can be problematic, because at the time of configuration it may be difficult to predict the distribution of offered rates among the AGWs (it is not necessarily in proportion with the number of lines). Instead of fixed Wj weights the leak rates could foe calculated automatically. When overload occurs, the MGC measures the real incoming call rate from the different AGWs. It then splits the GlobalLeakRate in proportion to the share of the $i^{th}$ AGW in the total incoming traffic (I). This way the $i^{th}$ AGW would get Lj=Ij/rGlobalLeakRate as the leak rate, in this way the control converges quicker to a state when none of the AGWs is unnecessarily over-restricted, and the capacity of the MGC is efficiently utilized. With this method, the AGW which is not sending any traffic (off-hook, notification) in a measurement period would get a $W_1$ weight of zero, meaning that it gets a notrat value of zero, in order not to completely expel such an AGW from offering traffic in the future, any AGW, even if its most recently received notrat is zero, is allowed to send a single off-hook notification to the MGC (or CS). In this single off-hook notification the AGW is allowed to include an additional parameter, its 'Required off-hook rate'. Such an off-hook signals to the MGC that this previously inactive AGW is now active, and if is then taken into account when calculating the notrat values next time. If the optional parameter 'Required off-hook rate' is included by the AGW, the MGC uses this number in place of I) for this particular AGW for the next notrat calculation.

Figure 3A:
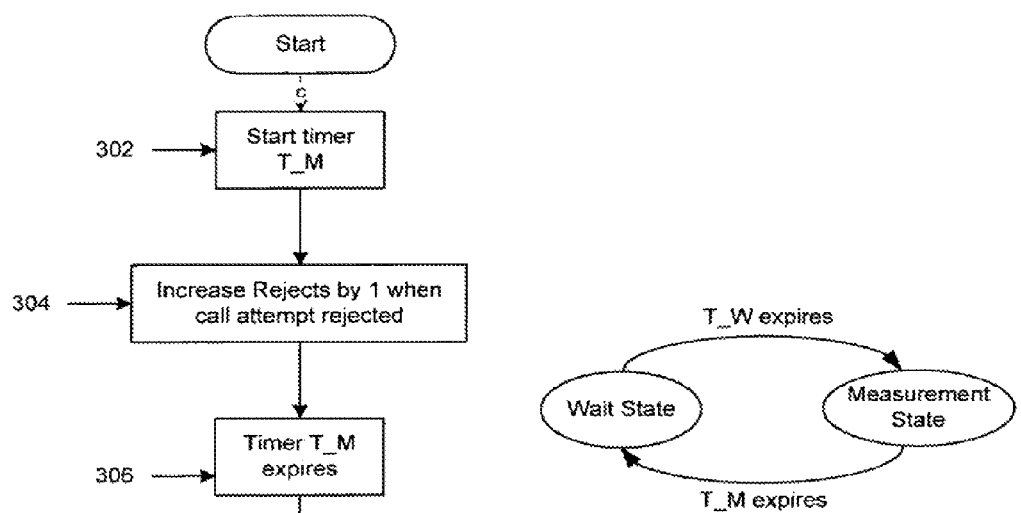
FIG. 3a illustrates the state transition diagram of a leak rate calculation method in accordance with a preferred embodiment of the present invention.
Figure 3B:
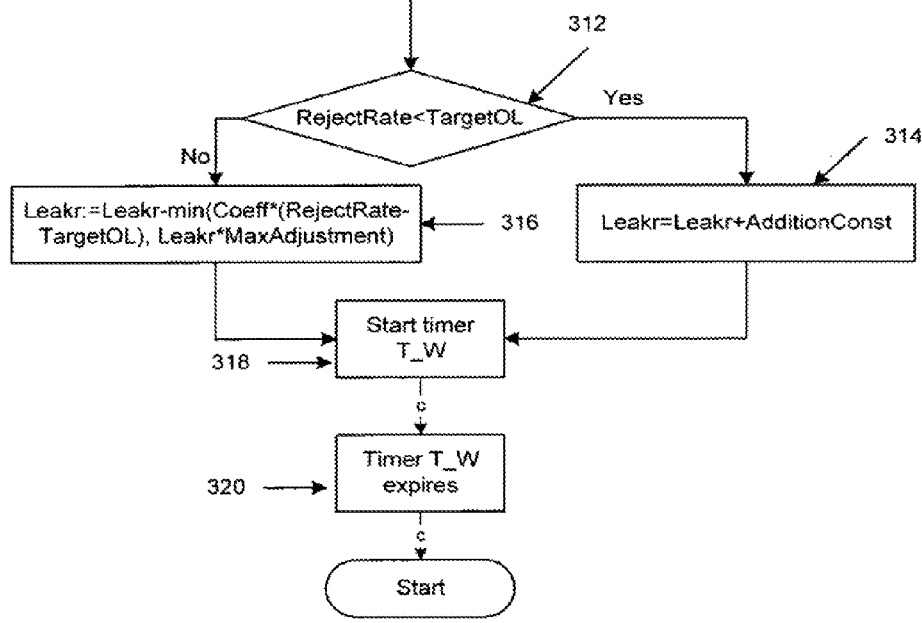
FIG. 3b depicts a leak rate calculation method in accordance with a preferred embodiment of the present invention.

Interoperability with Other Overload Control Mechanisms Protecting the Same Node FIG. 3 illustrates a leak rate calculation method in accordance with a preferred embodiment of the present invention. If is important to ensure interoperability of the ETSI_NR mechanism controlling the originating POTS calls and the overload control mechanism that is applied between the Call Servers and legacy POTS exchanges, in one embodiment of the AACC overload control algorithm the rejection rate of the target node is set at a predetermined low rate. Similarly, if is possible to calculate the GlobalLeakRate value using the rejection rate as a feedback for the ETSI NR control. A possible way to achieve the desired behavior is to implement a GlobalLeakRate calculation method as illustrated with a state machine in FIG. 3.

A timer T M Is started (step 302) denoting the time window for accumulating rejected call attempts. The number of rejected call attempts (step 304) is counted in a 'Measurement State'. When timer T M (time window for accumulating rejected call attempts) expires (step 306), RejectRate is calculated using RejectRate=Rejects/T_M (step 310) and compared to a predefined target reject rate (TargetOL) (step 312) also known as overload goal rate. If RejectRate exceeds the predefined target, the GlobalLeakRate will be decreased (step 316) and if RejectRate does not exceed the target, it will be increased (step 314). This way it is guaranteed that the rejection rate will converge to the desired target reject rate (TargetOL). Then 'Wait State' is entered starting timer T_W (step 318) letting time until the expiry of time T_W (step 320) for the latest GlobalLeakRate adjustment to take its effect. Control terminates if the end of overload is detected. Detection can be performed by means of watching the trend of the incoming traffic as described later. If the call reject rate is below the target reject rate, the leak rate is increased by a constant value (AdditionConst) used to fine tune the speed of the leak rate adaptation, otherwise it is decreased proportionally to the difference between the target reject rate (TargetOL) and the measured RejectRate. MaxAdjustment is a configuration parameter in a range 0<MaxAdjustment<=1, used to determine the maximum allowed change of the GlobalLeakRate in a single adaptation step. The above described algorithm is used for GlobalLeakRate calculation in the 'Overloaded' state. Leak rate adjustment may foe stated as follows:

```
IF(RejectRate >= TargetOL)
Leakr:=Leakr-min(Coeff*(RejectRate- TargetOL),
Leakr*MaxAdjustment)
IF(RejectRate<TargfefOLj, Leakr = Leakr+AdditionConst
```

In the Termination Pending' state the same GlobalLeakRate setting algorithm applies to the one described in the previous section, except that the GlobalLeakRate is only increased further if the current incoming call arrival (off-hook) rate from the AGWs is greater that the arrival rate measured in the previous T_M interval. Otherwise the GlobalLeakRate reverts to its previous value.

The AACC leak rate calculation algorithm typically operates on source nodes, which use the calculation to determine the amount of traffic they can send towards the target without overloading the target. In this embodiment, the calculation of the preferred amount of offered traffic is performed on the overloaded target node, and the allowable total load is then distributed between the sources.

Use of the same leak rate calculation algorithm for calculating the preferred amount of load on all interfaces if a node can be overloaded over multiple different interfaces (presented here in the context of ETSi_NR and AACC) is easy to be generalized. In the context of NGN, ETSI_NR and AACC, a CS can receive new (terminating or in-coming) calls from peer call servers and it can also receive new (originating) calls from dependent AGWs. The same calculation method is used for obtaining the rate of calls that can be served by the call server over all the interfaces, to ensure that capacity of the call server is shared fairly over all its interfaces. In the general context, the use of the same algorithm over multiple interfaces works regardless of the specifics of adaptation mechanism used by a given AACC implementation, and it works also if the node is not an MGC but any network node, which receives capacity demanding requests over multiple interfaces of different types.

Figure 4:
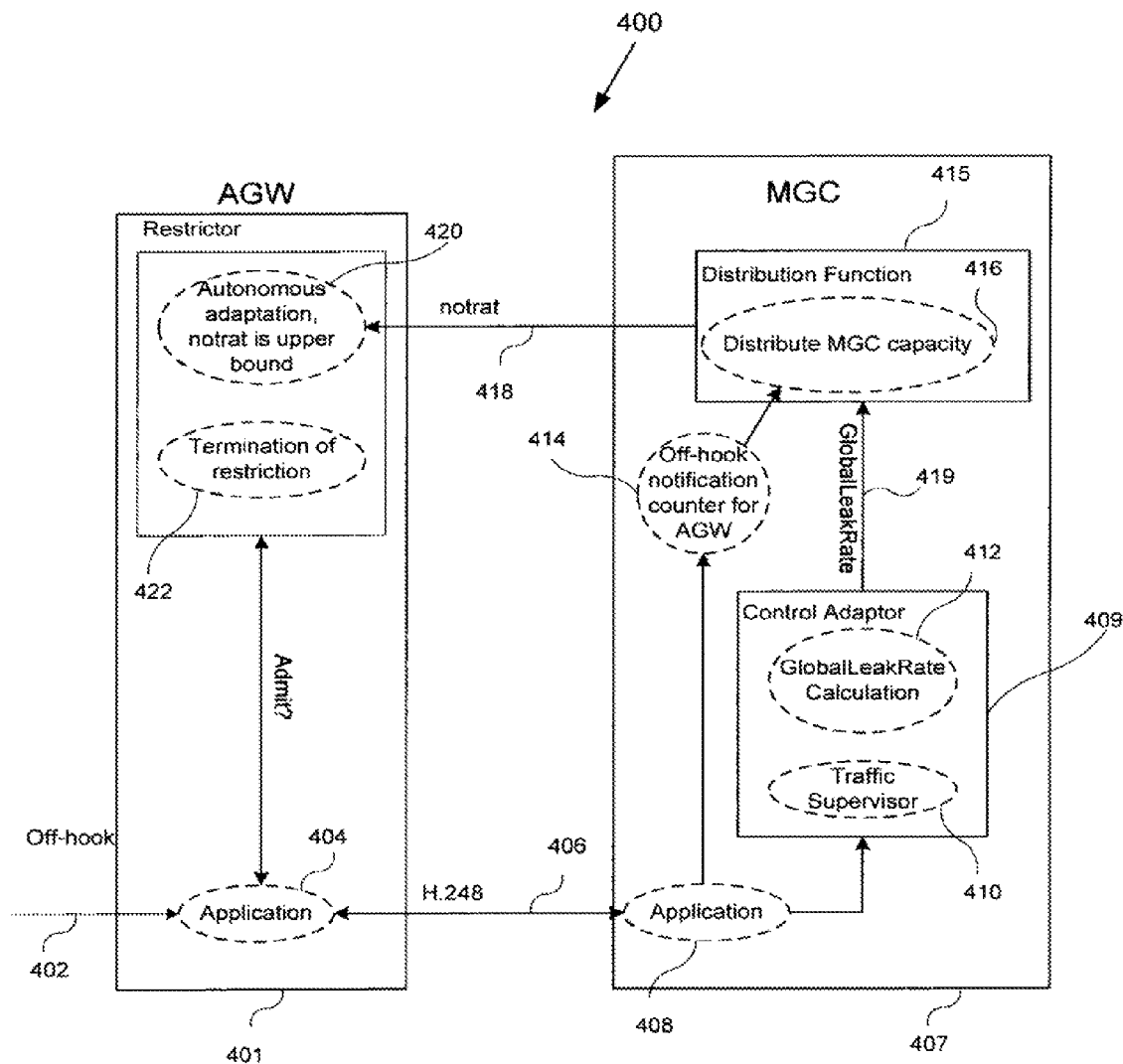
FIG. 4 illustrates a high-level block diagram of the interaction between an AGW (also MSAN) and a media gateway controller (also CS) in accordance with an embodiment of the present invention.

FIG. 4 illustrates a high-level block diagram of the interaction between an AGW (also MSAN) and a media gateway controller (also CS) in accordance with an embodiment of the present invention. Off-hook signal 402 is received by AGW 401 and passed to Application 404 which is the front half of a monitoring function. Whenever a new call is initiated by the subscriber (off-hook 402), application 404 checks the restrictor function to determine whether the newly received off-hook is subject to throttling or not. If it is rejected by the leaky bucket restricted (not shown), the subscriber is notified and if the new call passes the restriction check, the call is forwarded as a new call attempt (off-hook notification) towards the call server. Application 404 then incorporates off-hook signal 402 info H.248 communication with Application 408 the second half of the monitoring function in MGC 407. Application 408 utilizes notification counter 414 to communicate with logic in distribution function 415 which includes logic 416 for distributing the capacity of MGC 407 among all the connected AGWs, Notification counter is used for determining the rate of off-hook events associated with all the different AGWs.

Application 408 further notifies control adaptor 409 via traffic supervisor 410 to determine a current GlobalLeakRate, using the off-hook notification in conjunction with Global-LeakRate calculation function 412. The calculated Global-LeakRate 419 is sent to distribution functionality 415 in which the off-hook count for AGW 401 and the calculated GlobalLeakRate is used to determine whether the Notification Rate for AGW 401 should be changed. If notrat 418 is changed, that value is sent to AGW restrictor and the current notrat is ceased to be used and the new value of notrat 418 is installed as the current upper bound in the Autonomous adaptation function 420. The Autonomous adaptation function determines the leak rate of the leaky bucket restrictor running in the AGW using the measured off-hook rate and this upper bound as input to the autonomous leak rate calculation method. Termination of restriction function 422 is responsible for defecting if the AGW is instructed prematurely by the MGC to terminate the leaky bucket restrictor.

Figure 6:
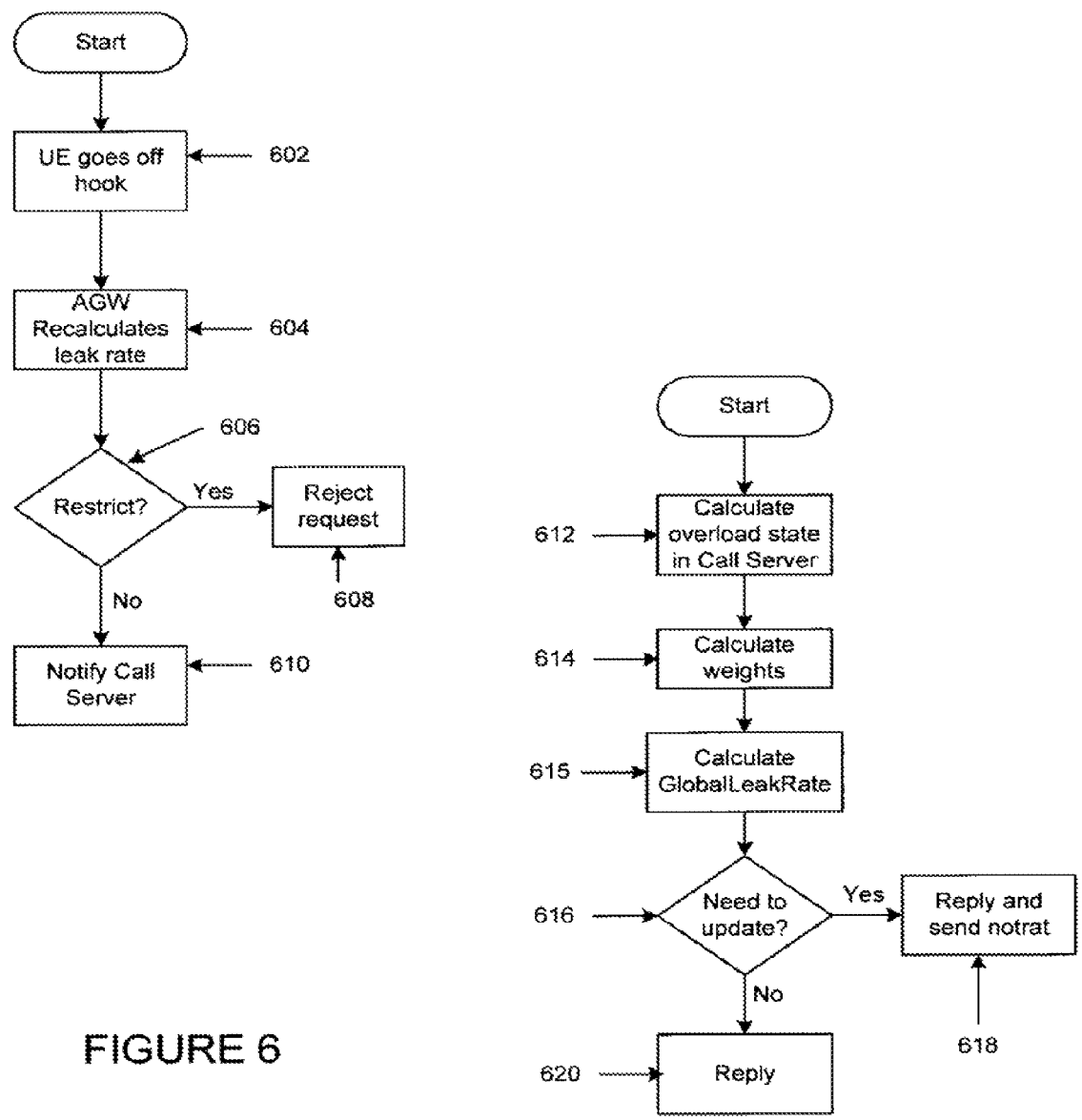
FIG. 6 illustrates a high-level flow diagram of a process in accordance with a preferred embodiment of the present invention.

FIG. 6 depicts a signaling diagram in accordance with an embodiment of the invention. If necessary, an AGW recalculates a leak rate using the received notrat and the measured rate of calls (Ij). A subscriber equipment sends an off-hook signal to the AGW initiating a new call Receipt of off-hook signal 502, causes a restriction function in the AGW to determine whether or not the off-hook 502 can be accepted or needs to be rejected because it exceeds the current rate (Lj) of the leaky bucket restrictor running in the AGW. If the determination is that off-hook 502 needs to be rejected in the AGW, off-hook signal 502 is refused in reject signal 504 to the subscriber equipment. If off-hook 502 is accepted, off hook notification 508 is sent to MGC 1, which adds off-hook notification 506 to the current total of notifications from this AGW and to the current total of notifications from all other AGWs connected to MGC 1.

The GlobalLeakRate in MGC 1 is updated taking into consideration all the current off-hook notifications received in a latest measurement period. Using the GlobalLeakRate, the notification rate (notrat) is recalculated and the current overload state is updated. Off-hook 502 is transmitted as a new call to MGC 2.

MGC 1 then determines whether to update the Notification Rate (notrat) according to whether the current notrat differs from the one sent previously to the AGW. if determination is made to update, then a new notrat 510 is sent to the AGW. If the determination is made that an update is not required, the AGW is notified of the acceptance of the call 512.

It is not easy to find a reasonable value for the MaxGlobalLeakRate configuration parameter on the MGC (also call server), since the actual GlobalLeakRate can easily go above the real processing capacity of the MGC to maximize the incoming off-hook rate. If the MaxGlobalLeakRate is underestimated, it is possible that the control switches off before the GlobalLeakRate reaches an equilibrium point, either because the upwards adaptation is too slow or because the Global-LeakRate cannot be increased further above MaxGlobal-LeakRate. In order to avoid premature termination of the control, the AGWs do not deactivate the leaky bucket immediately when receiving the '−1' value (any negative notrat value indicates that the MGC is not overloaded any more and the AGW (MSAN) is instructed to terminate the leaky bucket restriction from the MGC, but continue using the leaky bucket if it rejects calls. The leak rate $L_1$ is adapted autonomously (as described above) until the first measurement period is encountered without any call rejects on the AGW. If the control was too restrictive when it was stopped by signaling a negative notrat value towards the AGWs, the AGWs start a gradual autonomous upward adaptation of the Li leak rates. This may result in too much traffic being forwarded towards the CS, overloading it again but only gradually and not suddenly as happens in the prior-art solution.

Figure 8:
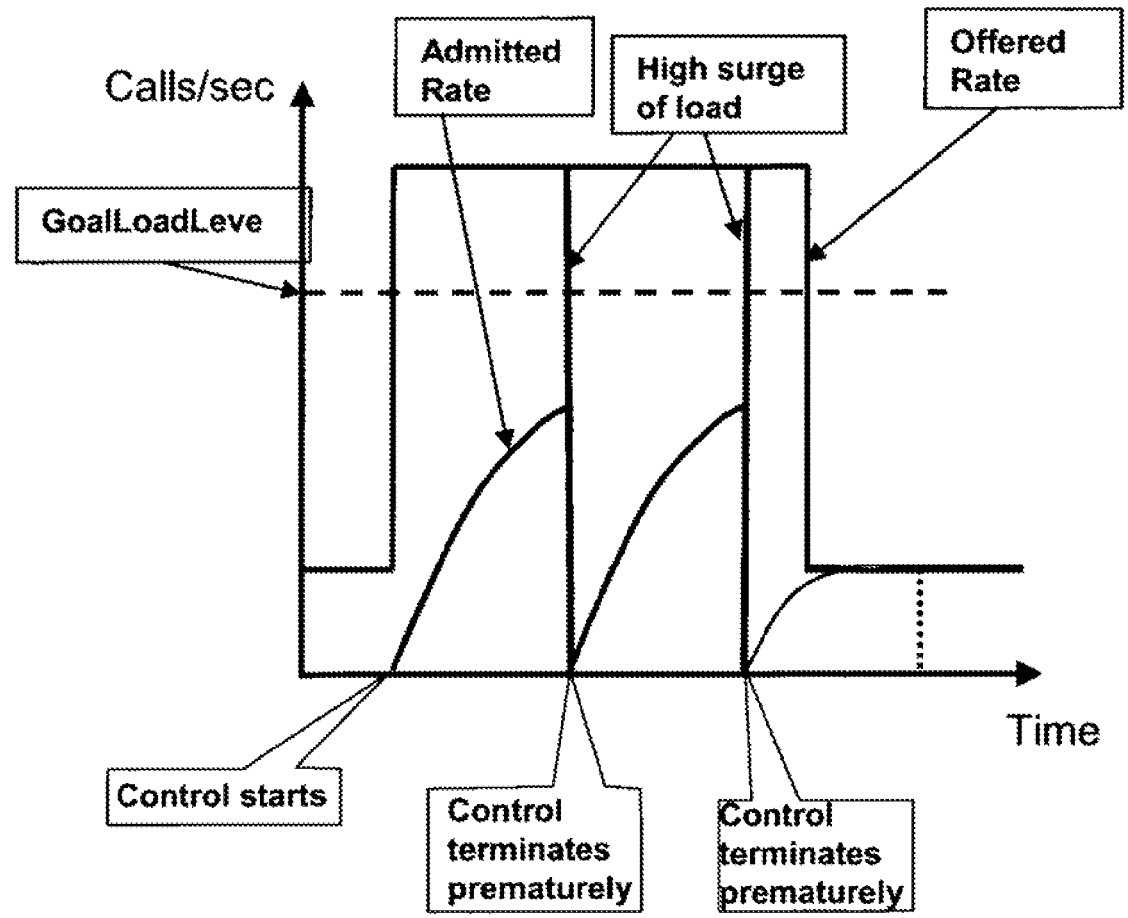
FIG. 8 depicts a graph illustrating control behavior problems according to an existing overload control solution.

FIG. 6 illustrates a high-level flow diagram of a process in accordance with a preferred embodiment of the present invention. FIG. 8 must be considered in conjunction with FIG. 3 as the process for calculating the overload state and the corresponding GlobalLeakRate in the MGC (or CS) occurs in parallel with the receipt and processing of the off-hook signals. The process in the AGW begins with a User Equipment connected to a Next Generation Network going off-hook (step 802). The off-hook signal is transmitted from the UE to an AGW (or MSAN). Upon receipt of the off-hook signal, a monitoring function in the AGW detects the off-hook signal. The AGW is capable of supporting thousands of subscribing User Equipment terminals and the monitoring function detects each connected(ing) UE. The off-hook events together with the notrat value are used to calculate the restriction rate (Li) (step 804). Based on the leaky bucket restrictor using a current restriction rate. If is determined whether the new call is acceptable or not (step 606). If the new call is not acceptable, the request is rejected (step 808). If the new call is acceptable, the off-hook notification is transmitted (step 610) to the MGC for processing. The MGC uses if for determining the rate of off-hook events associated with all the different AGWs.

The MGC is monitoring the MGC load (LoadLevel) (step 612) independent of the process in the AGW and independent of other processes like call handling and GlobalLeakRate calculation running in the MGC. MGC calculates a weighting factor for each AGW connected to the MGC using the per AGW off-hook counters described earlier (step 614). The weighting factor includes the number of new off-hook events that are received in predetermined, subsequent time periods from all the different AGWs. In the instance of a passive AGW the weighting factor of the AGW would be designated by the MGC as zero. If the passive MSAN sends a call to the call server, the call serves to notify the call server that the passive MSAN is now active. This causes the allowed leak rates to all the active AGWs to be recalculated and redistributed. If the optional parameter 'Required off-hook rate' is included by the MSAN, the MGC uses this number in place of Ij for this particular MSAN for the notrat calculation. If the MGC is in 'Overloaded' state or in Termination pending' state the GlobalLeakRate is calculated (step 615).

Whenever a reply is sent to the gateway for an off-hook, the reply is checked to see if a new notrat needs to be sent to the AGW (step 616). If an update is needed the notrat is included in the reply (step 618) and If an update is not needed, the notrat is not included in the reply (step 620).

Termination of Control

Termination of control is avoided by introducing an additional state TrafficSupervision (see FIG. 4, ref. 410), which is entered upon expiry of the TerminationPending timer. Before entering this state, the current value of the GlobalLeakRate shall be recorded. In this state the total incoming call rate generated by the connected AGWs is monitored in a configurable number of subsequent measurement periods. At the end of the last measurement period, the call rate per measurement period is checked to determine whether the incoming traffic has an increasing trend over the subsequent measurement periods. This can for example be done by using a simple linear regression, if the trend is increasing the monitoring of the incoming call rate in subsequent measurement periods is repeated. If the trend is not increasing, the control is terminated on the MGC side as well. Should the measured LoadLevel of MGC pass the GoalLoadLevel while in state TrafficSupervision', the control goes back to 'Overloaded' state, but instead of using InitGlobalLeakRate as the leak rate distributed towards the AGWs, the GlobalLeakRate is used which was valid and recorded when entering the TrafficSupervision' state.

Figure 7:
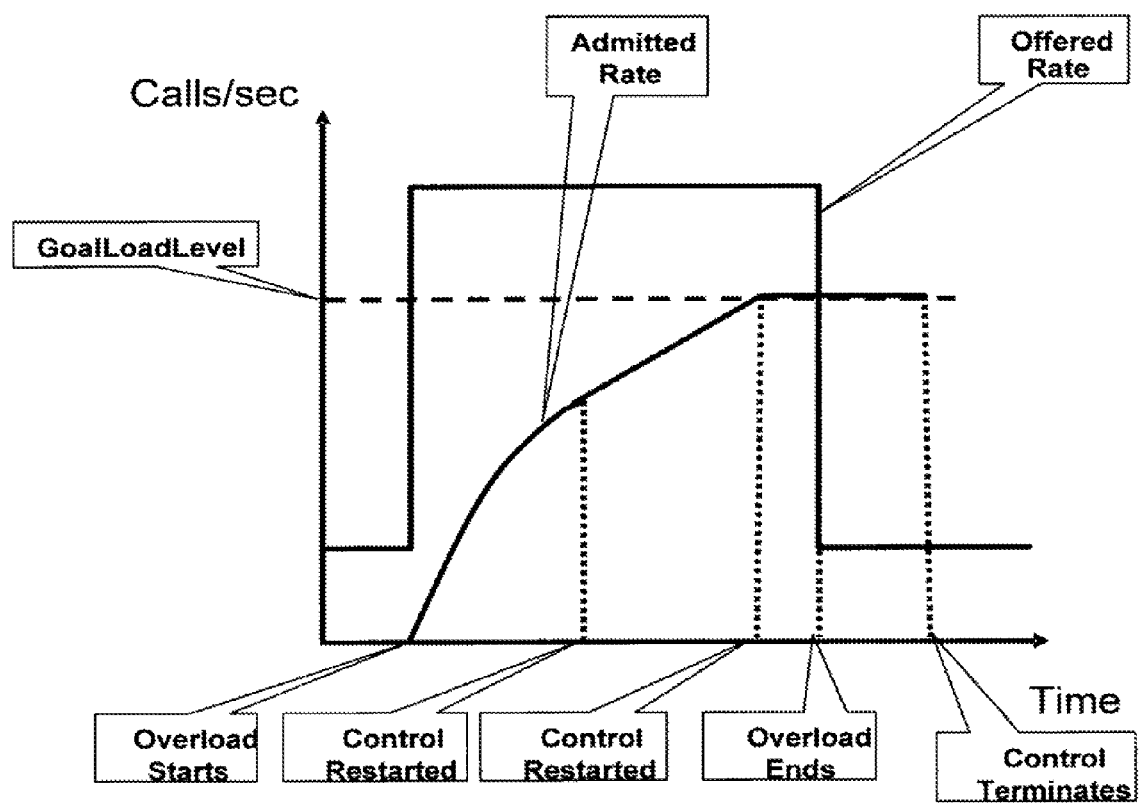
FIG. 7 depicts a graph illustrating the modified control behavior according to a preferred embodiment of the present invention.

FIG. 7 depicts a graph illustrating the modified control behavior according to a preferred embodiment of the present invention. In spite of a period of prolonged high offered rate, the graph indicates that the admitted rate is not oscillating, but it steadily increases towards the GoalLoadLevel. There are no sudden surges in the admitted rate, the control terminates only when the period of overload is indeed over. Whenever it is detected that the overload is not yet over the GlobalLeakRate is reinstated to its previously calculated value instead of reverting back to the InitGlobalLeakRate.

Applicability of the Methods

Multiple building blocks are disclosed, which can be applied together to achieve a robust overload control solution. However, depending on the networking scenario applying only a subset of the methods may be sufficient. For example, if in the networking scenario to be considered, the occurrence of focused overload as described above is not likely, or the MGC has relatively small capacity and the slow adaptation of the GlobalLeakRate is not a problem, distribution of the GlobalLeakRate according to a preconfigured weight set may suffice, and the technique described previously for dynamically obtaining the weight set can be switched off. Another example of an optional feature can be the introduction of the TrafficSupervision' state. If the utilization level resulting from the InitGlobalLeakRate is considered to be high enough by the network operator, or the re-occurrence of the overload after autonomous upward adaptation of the leak rates in the AGWs is considered to be a rare event then implementation of the additional TrafficSupervision' state is not needed.

The solution described here in the context of ETSI_NR is not in any way limited to the particular case of ETSI_NR. it is applicable in all overload control scenarios when a network entity is responsible for calculating the total traffic load it can sustain from its peer dependent entities, and it uses a protocol to inform its peers about this sustainable traffic load by allocating fractions of this total load to these peer entities.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of controlling traffic demand at a control node in a network, the method comprising:
   operating the control node in an overloaded state when an overload condition is detected in the network;
   while in the overloaded state, the control node:
   for each of a plurality of access nodes connected to the control node, regulating a leak rate, the leak rate being a rate at which the access node admits call attempts to the control node;
   monitoring a total incoming call attempt rate generated by the access nodes during a measurement period; and
   at the end of the measurement period:
   checking the incoming call attempt rate for an increasing trend relative to a previous measurement period; and
   if the trend is the same or decreasing, terminating the overloaded state.

2. The method of claim 1, wherein at least one of the access nodes is an Access Media Gateway and the control node is a Media Gateway Controller.

3. The method of claim 1, wherein at least one of the access nodes is a Multi-Service Access Nodes and the control node is a Call Server.

4. The method of claim 1, the method further comprising, while the control node is operating in the overloaded state:
   calculating an available capacity of the control node; and
   allocating a portion of the calculated available capacity to each access node in proportion to a share of the load of call attempts attributable to the access node.

5. The method of claim 4, wherein calculating available capacity of the control node comprises:
   setting a target service rate at which the control node serves call attempts sent from the access nodes to an initial value;
   starting a timer to indicate opening of a time window for accumulating rejected call attempts;
   accumulating a number of rejected call attempts until the timer expires;
   calculating a call attempt reject rate based on the number of rejected call attempts accumulated during the time window;
   determining whether the call attempt reject rate is less than a target overload rate;
   if the call attempt reject rate is less than the target overload rate, increasing the target service rate of the control node; and
   if the call attempt reject rate is more than the target overload rate, decreasing the target service rate of the control node.

6. The method of claim 4, further comprising, while the control node is operating in the overloaded state:
  receiving a call attempt from a passive one of the access nodes, said passive access node having a capacity allocation from the control node of zero; and
  re-allocating the calculated available capacity of the control node to at least one of the access nodes in response to the received call attempt from the passive access node.

7. The method of claim 6, further comprising while the control node is operating in the overloaded state:
  receiving a required off-hook rate parameter from the passive access node in connection with the received call attempt; and
  allocating a portion of the calculated available capacity of the control node to the passive access node based on the required off-hook rate parameter.

8. The method of claim 4, wherein calculating the available capacity of the control node includes calculating a target service rate at which connecting interfaces of the control node serve call attempts sent from the access nodes to the control node.

9. A method of controlling traffic demand at an access node in a network during an overload condition, the method comprising:
  restricting a leak rate at the access node when a control node that controls the access node is in an overloaded state, the leak rate being a rate at which the access node admits call attempts to the control node; and
  responsive to receiving an indication that the overloaded state at the control node has terminated, incrementally upwardly adapting the leak rate.

10. The method of claim 9, wherein at least one of the access nodes is an Access Media Gateway and the control node is a Media Gateway Controller.

11. The method of claim 9, wherein at least one of the access nodes is a Multi-Service Access Node and the control node is a Call Server.

12. The method of claim 9, further comprising, when the control node is in the overloaded state:
  comparing an incoming call attempt rate generated by the access node to the leak rate;
  at least partially in response to the incoming call attempt rate being greater than the leak rate, increasing the leak rate; and
  at least partially in response to the incoming call attempt rate being smaller than the leak rate, decreasing the leak rate.

13. A control node for controlling traffic at access nodes in a network, the control node being operable to perform steps comprising:
  entering an overloaded state of operation when an overload condition is detected in the network;
  when the control node is in the overloaded state of operation:
    for each of a plurality access nodes connected to the control node, regulating a leak rate, the leak rate being a rate at which the access node admits call attempts to the control node;
    monitoring a total incoming call attempt rate generated by the access nodes during a measurement period; and
    at the end of the measurement period:
      checking the incoming call attempt rate for an increasing trend relative to a previous measurement period; and
      if the trend is the same or decreasing, terminating the overloaded state.

14. The control node of claim 13, wherein at least one of the access nodes is an Access Media Gateway and the control node is a Media Gateway Controller.

15. The control node of claim 13, wherein at least one of the access nodes is a Multi-Service Access Nodes and the control node is a Call Server.

16. The control node of claim 13, wherein the control node is further operable to, when the control node is in the overloaded state of operation, perform steps comprising:
  calculating an available capacity of the control node; and
  allocating a portion of the calculated available capacity to each access node in proportion to a share of the load of call attempts attributable to the access node.

17. The control node of claim 16, wherein the control node is operable to calculate available capacity by performing steps comprising:
  setting a target service rate at which the control node serves call attempts sent from the access nodes to an initial value;
  starting a timer to indicate opening of a time window for accumulating rejected call attempts;
  accumulating a number of rejected call attempts until the timer expires;
  calculating a call attempt reject rate based on the number of rejected call attempts accumulated during the time window;
  determining whether the call attempt reject rate is less than a target overload rate;
  if the call attempt reject rate is less than the target overload rate, increasing the target service rate of the control node; and
  if the call attempt reject rate is more than the target overload rate, decreasing the target service rate of the control node.

18. The control node of claim 16, wherein the control node is further operable to perform steps comprising:
  receiving a call attempt from a passive one of the access nodes, said passive access node having a capacity allocation from the control node of zero; and
  re-allocating the calculated available capacity of the control node to at least one of the access nodes in response to the received call attempt from the passive access node.

19. The control node of claim 18, wherein the control node is further operable to perform steps comprising:
  receiving a required off-hook rate parameter from the passive access node in connection with the received call attempt; and
  allocating a portion of the calculated available capacity of the control node to the passive access node based on the required off-hook rate parameter.

20. The control node of claim 16, wherein the control node is operable to calculate available capacity by performing a step comprising:
  calculating a target service rate at which connecting interfaces of the control node serve call attempts sent from the access nodes to the control node.

21. An access node for providing access to a network for one or more subscribers, the access node being operable to perform steps comprising:
  restricting a leak rate at the access node when a control node that controls the access node is in an overloaded state, the leak rate being a rate at which the access node admits call attempts to the control node; and
  responsive to receiving an indication that the overloaded state at the control node has terminated, incrementally upwardly adapting the leak rate.

22. The access node of claim 21, wherein the access node is an Access Media Gateway and the control node is a Media Gateway Controller.

23. The access node of claim 21, wherein the access node is a Multi-Service Access Node and the control node is a Call Server.

24. The access node of claim 21, the access node being further operable to perform steps comprising:
- comparing an incoming call attempt rate generated by the access node to the leak rate;
- at least partially in response to the incoming call attempt rate being greater than the leak rate, increasing the leak rate; and
- at least partially in response to the incoming call attempt rate being smaller than the leak rate, decreasing the leak rate.

* * * * *

UNITED STATES PATENT AND TRADEMARK OFFICE
CERTIFICATE OF CORRECTION

| | | |
|---|---|---|
| PATENT NO. | : 9,253,099 B2 | |
| APPLICATION NO. | : 13/873520 | |
| DATED | : February 2, 2016 | |
| INVENTOR(S) | : Szabó et al. | |

It is certified that error appears in the above-identified patent and that said Letters Patent is hereby corrected as shown below:

On the Title Page, in Item (57), under "ABSTRACT", in Column 2, Line 7, delete "Server" and insert -- Server. --, therefor.

Drawings

In Fig. 3, Sheet 3 of 8, delete "  " and insert -- -- , therefor.

In Fig. 8, Sheet 8 of 8, delete "GoalLoadLeve" and insert -- GoalLoadLevel --, therefor.

Specification

In Column 1, Line 8, delete "of co-pending U.S." and insert -- of U.S. --, therefor.

In Column 1, Line 9, delete "2009," and insert -- 2009, now Pat. No. 8,446,829, --, therefor.

In Column 1, Line 30, delete "Mufti" and insert -- Multi --, therefor.

In Column 1, Line 63, delete "institute" and insert -- Institute --, therefor.

In Column 1, Line 66, delete "Inappropriate" and insert -- inappropriate --, therefor.

In Column 2, Line 9, delete "(ETSi_NR)" and insert -- (ETSI_NR) --, therefor.

In Column 2, Lines 13-14, delete "ETSi_NR. ETSi_NR" and insert -- ETSI_NR. ETSI_NR --, therefor.

In Column 2, Line 17, delete "MGCs," and insert -- MGCs. --, therefor.

Signed and Sealed this
Twenty-sixth Day of July, 2016

Michelle K. Lee
*Director of the United States Patent and Trademark Office*

CERTIFICATE OF CORRECTION (continued)

Specification

In Column 2, Line 20, delete "Initiates" and insert -- initiates --, therefor.

In Column 2, Line 25, delete "teak" and insert -- leak --, therefor.

In Column 2, Line 32, delete "end" and insert -- and --, therefor.

In Column 2, Line 59, delete "teak" and insert -- leak --, therefor.

In Column 3, Line 12, delete "Illustrating" and insert -- illustrating --, therefor.

In Column 3, Line 15, delete "208" and insert -- 206 --, therefor.

In Column 3, Line 30, delete "206" and insert -- 208 --, therefor.

In Column 3, Line 59, delete "1000 cail/s" and insert -- 1000 call/s --, therefor.

In Column 3, Line 62, delete "minutes!" and insert -- minutes. --, therefor.

In Column 4, Line 6, delete "band," and insert -- hand, --, therefor.

In Column 4, Line 15, delete "infernal" and insert -- internal --, therefor.

In Column 4, Line 46, delete "GoafLoadLevel" and insert -- GoalLoadLevel --, therefor.

In Column 4, Line 59, delete "maybe" and insert -- may be --, therefor.

In Column 5, Line 14, delete "Is" and insert -- is --, therefor.

In Column 5, Line 33, delete "2, If the" and insert -- 2. if the --, therefor.

In Column 5, Line 37, delete "Control Adaptor" and insert -- ControlAdaptor --, therefor.

In Column 5, Line 53, delete "bandied" and insert -- handled --, therefor.

In Column 5, Line 58, delete "Ineffective, in" and insert -- ineffective. In --, therefor.

In Column 6, Line 57, delete "invention; and" and insert -- invention; --, therefor.

In Column 6, Line 60, delete "invention." and insert -- invention; and --, therefor.

In Column 7, Line 6, delete "(ETSI-MR)" and insert -- (ETSI_NR) --, therefor.

In Column 7, Line 15, delete "info" and insert -- into --, therefor.

CERTIFICATE OF CORRECTION (continued)
U.S. Pat. No. 9,253,099 B2

Specification

In Column 7, Lines 22-23, delete "Li☐(1+R)." and insert -- Li*(1+R). --, therefor.

In Column 7, Line 33, delete "teak" and insert -- leak --, therefor.

In Column 7, Line 43, delete "I_i=Globall_eakRate*Wi" and insert -- I_i=GlobalLeakRate*Wi. --, therefor.

In Column 7, Line 48, delete "foe" and insert -- be --, therefor.

In Column 7, Line 53, delete "rate, in" and insert -- rate. In --, therefor.

In Column 7, Line 57, delete "(off-hook," and insert -- (off-hook --, therefor.

In Column 7, Lines 58-59, delete "zero, in" and insert -- zero. In --, therefor.

In Column 7, Line 66, delete "if is" and insert -- it is --, therefor.

In Column 8, Line 2, delete "I)" and insert -- Ij --, therefor.

In Column 8, Line 7, delete "If is" and insert -- It is --, therefor.

In Column 8, Line 10, delete "exchanges, in" and insert -- exchanges. In --, therefor.

In Column 8, Line 12, delete "if is" and insert -- it is --, therefor.

In Column 8, Line 18, delete "T M Is" and insert -- T M is --, therefor.

In Column 8, Line 45, delete "foe" and insert -- be --, therefor.

In Column 8, Line 52, delete "IF(RejectRate<TargfefOLj," and insert -- IF(RejectRate<TargetOLj, --, therefor.

In Column 9, Line 4, delete "ETSi_NR" and insert -- ETSI_NR --, therefor.

In Column 9, Line 31, delete "info" and insert -- into --, therefor.

In Column 9, Line 36, delete "AGWs," and insert -- AGWs. --, therefor.

In Column 9, Line 54, delete "defecting" and insert -- detecting --, therefor.

Figure 5:
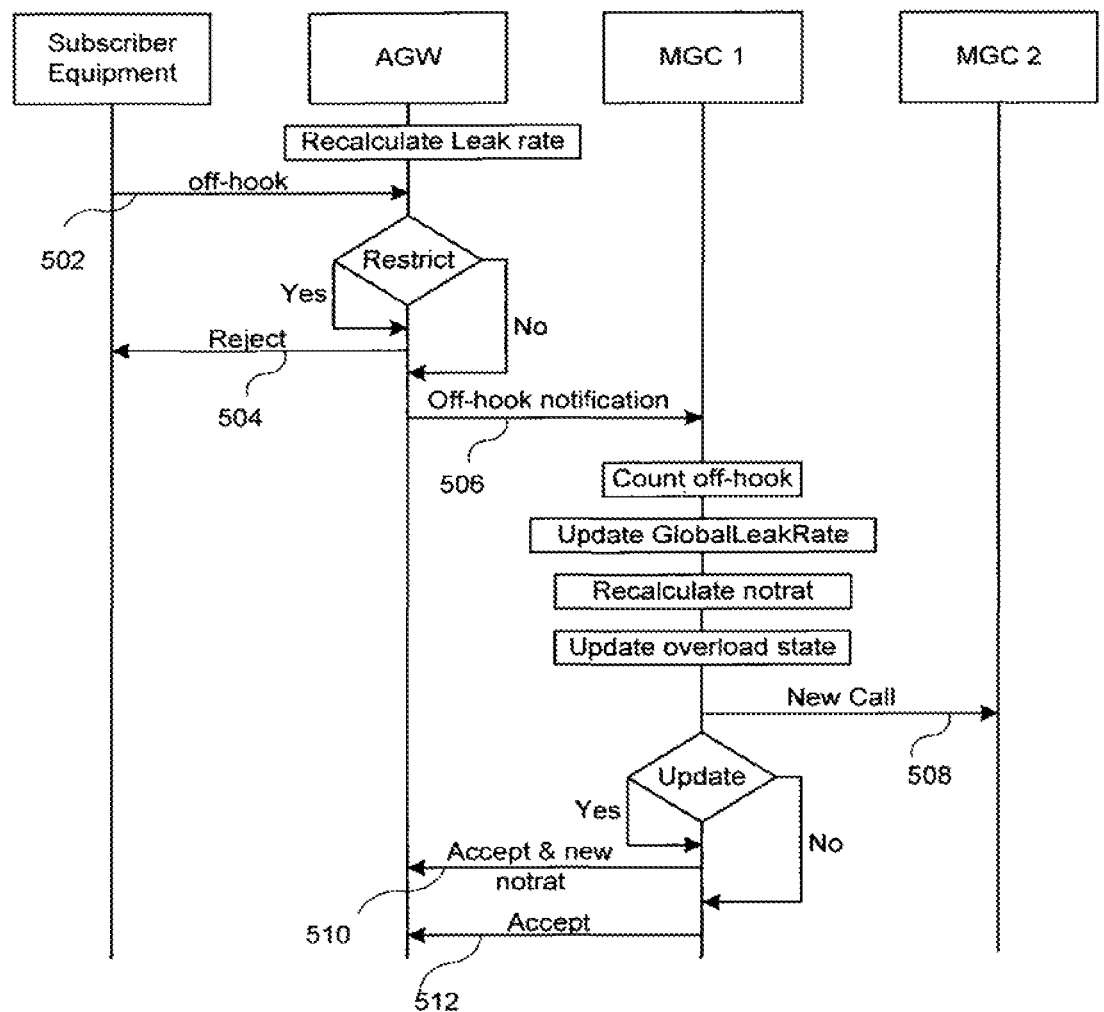
FIG. 5 depicts a signaling diagram in accordance with an embodiment of the invention.

In Column 9, Line 56, delete "FIG. 6" and insert -- FIG. 5 --, therefor.

CERTIFICATE OF CORRECTION (continued)
U.S. Pat. No. 9,253,099 B2

Specification

In Column 10, Line 13, delete "if determination" and insert -- If determination --, therefor.

In Column 10, Line 43, delete "FIG. 8" and insert -- FIG. 6 --, therefor.

In Column 10, Line 49, delete "(step 802)." and insert -- (step 602). --, therefor.

In Column 10, Line 56, delete "(step 804)." and insert -- (step 604). --, therefor.

In Column 10, Line 57, delete "rate. If is" and insert -- rate, it is --, therefor.

In Column 10, Line 59, delete "(step 808)." and insert -- (step 608). --, therefor.

In Column 10, Line 61, delete "uses if" and insert -- uses it --, therefor.

In Column 11, Line 19, delete "If an" and insert -- if an --, therefor.

In Column 12, Line 6, delete "ETSI_NR. it is" and insert -- ETSI_NR. It is --, therefor.